United States Patent
Fujimori (10) Patent No.: US 7,372,608 B2
(45) Date of Patent: May 13, 2008

(54) LIGHT CONTROL DEVICE AND LIGHT CONTROL SYSTEM USING THE SAME

(75) Inventor: Yoshikazu Fujimori, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/563,907

(22) Filed: Nov. 28, 2006

(65) Prior Publication Data

US 2007/0171504 A1     Jul. 26, 2007

(30) Foreign Application Priority Data

Nov. 28, 2005    (JP)    ............................. 2005-341460

(51) Int. Cl.
  *G02F 1/03*   (2006.01)
  *G02F 1/29*   (2006.01)
  *G02F 1/135*  (2006.01)

(52) U.S. Cl. ...................... 359/245; 359/260; 359/237; 359/248; 359/318; 359/320; 349/25; 349/30; 349/116

(58) Field of Classification Search ................ 359/237, 359/238, 245, 248, 260, 29, 277, 278, 315, 359/318, 320, 321, 326, 498, 499, 559, 580, 359/581, 583–586, 589; 372/10, 20, 24, 372/26, 32, 43, 45, 50, 50.1, 50.11, 96, 99, 372/102; 349/10, 25, 28, 30, 113, 116, 137; 348/767; 369/103; 250/389
See application file for complete search history.

(56) References Cited

U.S. PATENT DOCUMENTS

| | | | | |
|---|---|---|---|---|
| 2,892,380 | A | * | 6/1959 | Baumann et al. ........... 359/277 |
| 5,044,736 | A | * | 9/1991 | Jaskie et al. ................ 359/291 |
| 5,148,298 | A | * | 9/1992 | Shigeta et al. ................ 349/25 |
| 5,155,617 | A | * | 10/1992 | Solgaard et al. ............ 359/245 |
| 5,570,213 | A | * | 10/1996 | Ruiz et al. ................... 349/116 |
| 5,583,676 | A | * | 12/1996 | Akiyama et al. ............. 349/28 |
| 6,819,463 | B2 | * | 11/2004 | Noonan ....................... 359/245 |
| 7,057,788 | B2 | * | 6/2006 | Ohbayashi et al. ......... 359/260 |
| 7,078,856 | B2 | * | 7/2006 | Fujii ........................... 313/508 |
| 7,092,046 | B2 | * | 8/2006 | Feoktistov et al. ........... 349/25 |
| 2002/0154589 | A1 | | 10/2002 | Tanaka et al. |
| 2006/0088066 | A1 | * | 4/2006 | He ............................... 372/10 |
| 2007/0013991 | A1 | * | 1/2007 | Kise et al. ................... 359/245 |

FOREIGN PATENT DOCUMENTS

| | | |
|---|---|---|
| JP | 05-257103 A | 10/1993 |
| JP | 07-146657 A | 6/1995 |
| JP | 2002-297008 A | 10/2002 |

* cited by examiner

*Primary Examiner*—Loha Ben
(74) *Attorney, Agent, or Firm*—Keating & Bennett, LLP (57) ABSTRACT

A light control device includes a substrate, a first reflective layer, a light modulating film in which the refractive index varies according to an applied electric field, a transparent electrode, and a second reflective layer having a reflection characteristic such that the reflection band and transmission band exhibit a steep switching pattern at a specified wavelength. The device is configured such that the specified wavelength and the resonant wavelength of a Fabry-Perot resonator defined by the first reflective layer, the light modulating film, the transparent electrode, and the second reflective layer are substantially the same. The reflection-type light control device has improved light utilization efficiency.

11 Claims, 11 Drawing Sheets

LIGHT CONTROL DEVICE AND LIGHT CONTROL SYSTEM USING THE SAME

BACKGROUND OF THE INVENTION

1. Field of the Invention

The present invention relates to a light control device using an electro-optic material whose refractive index varies as a result of the application of an electric field, and a light control system including the light control device.

2. Description of the Related Art

Recently, digital information recording systems utilizing the principle of holograms have been known as large-capacity recording systems. See, for instance, Patent Reference 1 (Japanese Patent Application Kokai No. 2002-297008).

For example, materials that have the electro-optic effect such as lanthanum lead titanate zirconate (hereafter referred to as "PLZT") can be used as the material for a spatial light modulator of a hologram recording device. PLZT is a transparent ceramic having a composition of $(Pb_{1-y}La_y)(Zr_{1-x}Ti_x)O_3$. The electro-optic effect refers to a phenomenon in which polarization occurs in a substance when an electric field is applied to the substance, so that the refractive index is varied. If the electro-optic effect is utilized, the phase of light can be switched by switching the application of a voltage on and off. Therefore, a light modulating material having the electro-optic effect can be applied to the light shutter of a spatial light modulator or the like.

In this type of application to elements such as a light shutter, bulk PLZT has been widely utilized. See, for example, Patent Reference 2 (Japanese Patent Application Kokai No. H5-257103). However, it is difficult for light shutters using bulk PLZT to meet the demand for miniaturization and integration and the demand for a reduction of an operating voltage and a cost reduction. Furthermore, a bulk method for manufacturing bulk PLZT includes a step of treating the PLZT at a high temperature of 1000° C. or higher after mixing a metal oxide constituting a raw material. Therefore, when such a method is applied to the element formation process, many restrictions are applied to the material selection, element structure, and the like.

For these reasons, instead of bulk PLZT, an approach involving the application of a thin film of PLZT formed on a base material to a light control element has been studied. Patent Reference 3 (Japanese Patent Application Kokai No. H7-146657) describes a display device in which a PLZT film is formed on a transparent substrate such as glass, and comb electrodes are provided on this film. This display device has a construction in which polarizing plates are provided on both surfaces of the display substrate on which the PLZT film is formed. Here, desired pixels are driven by connecting the electrode terminal parts of the respective pixels to an external driving circuit, so that a desired display can be performed by transmitted light from a light source provided on one side of the display substrate.

However, in order to put a light modulating film such as the PLZT film described above to practical use as an element such as a light shutter, it is necessary to create a driving circuit for controlling the on/off switching of a voltage that is applied to the light modulating film on a substrate, together with the light modulating film. In this case, in the construction described in Patent Reference 3, the region where the driving circuit is formed cannot be used as the display region, so that there is a problem in that an effective display region cannot be sufficiently obtained.

Furthermore, in the transmitting-type display device described above, when visible light is used as the illuminating light, the following problem is also encountered. More specifically, a driving circuit cannot be formed on a substrate including silicon or the like that is not transparent with respect to visible light. Moreover, in the display device described in Patent Reference 3, light loss caused by polarizing plates occurs because of the use of the polarizing plates.

SUMMARY OF THE INVENTION

In order to overcome the problems described above, preferred embodiments of the present invention provide a reflection-type light control device with improved light utilization efficiency and a light control system using the same.

In order to solve the above-mentioned problems, the light control device of a first preferred embodiment of the present invention includes a substrate, a first reflective layer provided on the substrate, a light modulating film which is provided on the first reflective layer and in which the refractive index varies according to an applied electric field, a transparent electrode provided on the light modulating film, and a second reflective layer provided on the transparent electrode and having a reflection characteristic such that the reflection band and transmission band exhibit a steep switching pattern at a specified wavelength, wherein the light control device is configured such that the specified wavelength and the resonant wavelength of a Fabry-Perot resonator defined by the first reflective layer, the light modulating film, the transparent electrode, and the second reflective layer are substantially the same.

With this preferred embodiment, as a result of the light modulating film and transparent electrode being sandwiched by the first and second reflective layers, a Fabry-Perot resonator is constructed in which light incident from the outside undergoes multiple reflections between the two reflective layers. By varying an electric field applied to the light modulating film, the refractive index of the light modulating film is varied, and the resonant wavelength of the resonator can be shifted, so that the amount of reflected light among the light that is incident from the upper surface of the light control device can be controlled. In this case, if the second reflective layer is formed such that the reflection characteristic of the second reflective layer exhibits a steep switching pattern of the reflection band and transmission band at a specified wavelength, and this specified wavelength is substantially the same as the resonant wavelength, then it is possible to increase the variation in the reflectance when the resonant wavelength is shifted. As a result, the on/off ratio of the light control device can be improved, so that light utilization efficiency can be improved.

The light control device may also be configured such that the thickness $t_p$ of the light modulating film is such that $$t_p = \frac{\lambda_c \{2\pi m + (\pi - \phi)\}}{4\pi n_p \cos\theta_p} - \frac{n_i \cos\theta_i}{n_p \cos\theta_p} t_i, \qquad \text{Numerical Formula 1}$$

where $\lambda_c$ is the specified wavelength, $n_p$ is the refractive index of the light modulating film, $n_i$ is the refractive index of the transparent electrode, $t_i$ is the thickness of the transparent electrode, $\theta_i$ is the angle of incidence of light incident on the light control device, $\theta_p$ is the angle of incidence of light incident on the light modulating film from the transparent electrode, φ is the phase variation amount of light reflected by the first reflective layer, and m is the order number. In this case, it is possible to make the resonant wavelength and specified wavelength substantially the same.

The order number m may be an integer in the range of $4 \leq m \leq 10$. The on/off ratio of the light control device increases in proportion to the thickness of the light modulating film. However, if the thickness of the light modulating film becomes excessively large, a greater electric field must be applied in order to obtain a sufficient variation in the refractive index. In cases where the thickness of the light modulating film is set as described above, a high on/off ratio can be achieved by the application of a preferable voltage, so that light utilization efficiency can be improved.

The second reflective layer may have a laminated structure defined by a plurality of dielectric films having different refractive indices. As a result of forming the second reflective layer by laminating dielectric films having different refractive indices, it is possible to control the reflectance with a high degree of precision by varying the number of laminated layers and the materials of the dielectric films.

At least one of the plurality of dielectric films may be a silicon oxide film. Furthermore, at least one of the plurality of dielectric films may be a silicon nitride film. In cases where a dielectric film is formed as a silicon oxide film or silicon nitride film, an ordinary film formation technique of the silicon semiconductor manufacturing process can be applied "as is."

The number of laminations of the dielectric films in the second reflective layer may be 19 to 23 layers. In this case, a balance between the amount of shifting of the resonant wavelength and the steepness of the variation in the reflectance is maintained, and a high on/off ratio can be preferably achieved, so that light utilization efficiency can be improved.

The light modulating film may be formed from an electro-optic material whose refractive index varies in proportion to the square of the applied electric field. The electro-optic material may be lead titanate zirconate or lanthanum lead titanate zirconate, for example.

The above-mentioned light control device may be formed on a semiconductor substrate. In this case, because the light control device can be formed by integrating the control circuit of the light control device on a semiconductor substrate, a reduction in the size of the light control device and its control circuit can be achieved.

Another preferred embodiment of the present invention includes a light control system. The light control system includes the above-mentioned light control device, a light-emitting portion that illuminates the light control device with light, and a light-receiving portion that receives the light emitted from the light control device. With this preferred embodiment, for example, hologram recording devices or display devices can be achieved.

Furthermore, any combination of the above-mentioned constituent elements and preferred embodiments in which the expression of the present invention is changed between a method, apparatus, or the like are also considered to be preferred embodiments of the present invention.

With the light control device of the preferred embodiments of the present invention, light utilization efficiency can be improved.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

An outline of a light control device according to a first preferred embodiment of the present invention will be described. The light control device is a light control device in which the reflectance varies as a result of the application of a voltage from the outside. The light control device has the construction of a Fabry-Perot resonator, and includes a light modulating film whose refractive index varies according to the application of an electric field, and two reflective layers that are formed so as to sandwich the light modulating film. When a control signal is applied in a state in which light is incident on the light control device, the reflectance of the light control device can be varied, so that the intensity of the reflected light can be controlled. Because the light reflected by the light control device has an intensity proportional to the reflectance, this reflected light can be used for various applications by recording and detecting this reflected light using a recording medium, light detecting element, or the like.

Figure 1:
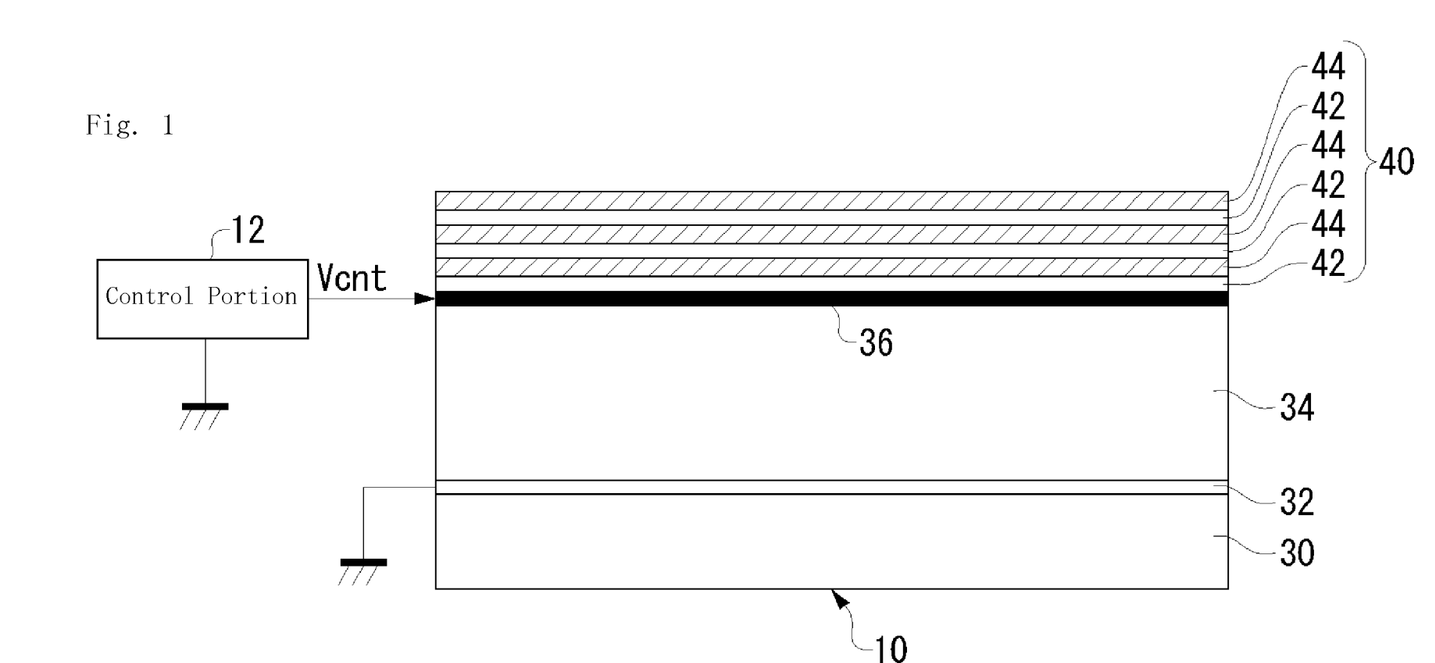
FIG. 1 is a sectional view of a light control device according to a first preferred embodiment of the present invention.

FIG. 1 is a sectional view of a light control device 10 according to a first preferred embodiment of the present invention. The light control device 10 includes a substrate 30, a first reflective layer 32, a light modulating film 34, a transparent electrode 36, and a second reflective layer 40.

The light control device 10 of the first preferred embodiment is formed on the substrate. Glass, silicon, or the like having a flat surface can be preferably used as the material of the substrate 30. For example, in the case of the substrate 30 such as a semiconductor substrate made of silicon, a switching element may be provided on the substrate, and a light control device 10 may be formed thereon. In this case, a reduction in the size of the light control device 10 and its control circuit can be achieved.

The first reflective layer 32 is formed on the substrate 30. For instance, a metal material such as Pt can be preferably used as the material of the first reflective layer 32. The thickness of the first reflective layer 32 is approximately 200 nm, for example. In the first preferred embodiment, the first reflective layer 32 is formed from Pt, and as will be described later, the first reflective layer 32 also functions as an electrode that applies an electric field to the light modulating film 34. In cases where the first reflective layer 32 is formed from Pt, the reflectance of the first reflective layer 32 is about 50% to about 80%.

The light modulating film 34 is provided on the upper surface of the first reflective layer 32. A solid electro-optic material whose refractive index varies according to an electric field that is applied is selected as the material of the light modulating film 34. PLZT (lanthanum lead titanate zirconate), PZT (lead titanate zirconate), $LiNbO_3$, GaAMQW, SBN ((Sr, Ba) $Nb_2O_6$), or the like can be used as such an electro-optic material. However, the use of PLZT is especially preferable.

The thickness $t_p$ of the light modulating film 34 is determined according to the angle of incidence and wavelength of the incident light. For example, in cases where the incident light is red light in the vicinity of 650 nm, it is desirable to form the light modulating film 34 with a thickness in the range of about 500 nm to about 1500 nm. As will be described later, the electric field applied to the light modulating film 34 is applied in the thickness direction of the film. Therefore, by setting the film thickness $t_p$ at about 1500 nm or less, it becomes easy to apply an electric field for obtaining a sufficient variation in the refractive index. Furthermore, a sufficient variation in the optical film thickness can be obtained by setting the film thickness $t_p$ at about 500 nm or more.

The transparent electrode 36 is provided on the upper surface of the light modulating film 34. For example, the transparent electrode 36 can be formed from ITO (indium tin oxide), ZnO, $IrO_2$, or the like. In cases where the transparent electrode 36 is formed from ITO or ZnO, the thickness $t_i$ thereof is about 100 nm to about 150 nm. In cases where the transparent electrode 36 is formed from $IrO_2$, it is desirable that the thickness $t_i$ be a smaller value (e.g., approximately 50 nm) Because the resistance value and transmissivity are in a trade-off relationship in the transparent electrode 36, the thickness $t_i$ thereof may be determined.

The second reflective layer 40 is formed on the upper surface of the transparent electrode 36. The second reflective layer 40 is formed from a dielectric multilayer film, and first dielectric films 42 and second dielectric films 44 having different refractive indices are alternately laminated. In the following description, the refractive index of dielectric films having a larger refractive index is expressed as $n_H$, while the refractive index of dielectric films having a smaller refractive index is expressed as $n_L$. $SiO_2$ ($n_L$=1.48) and $Si_3N_4$ ($n_H$=2.0) can be used as a combination of the materials of the first dielectric films 42 and second dielectric films 44. In cases where the dielectric multilayer film is formed from silicon oxide films and silicon nitride films, the manufacturing process and manufacturing device of a silicon semiconductor integrated circuit can be used "as is."

The dielectric multilayer film can be formed using a plasma CVD (chemical vapor deposition) method. The $SiO_2$ films can be caused to grow preferably under the temperature condition of about 200° C. in a TEOS and $O_2$ atmosphere, and the $Si_3N_4$ films can be caused to grow preferably under the temperature condition of about 200° C. in an $SiH_4$ and $NH_3$ atmosphere. Moreover, the dielectric multilayer film may also be formed using an ion beam sputtering method.

The film thickness d of each layer of the first dielectric films 42 and second dielectric films 44 is adjusted such that d=$\lambda$/(n×4), where $\lambda$ is the wavelength of light that is incident on the light control device 10, and n is the refractive index of the dielectric film.

For example, in cases where red laser light with a wavelength of 650 nm is used in the light control device 10, the thickness d1 of the first dielectric films 42 is set such that d1=633/(4×1.48)≈109 nm when $SiO_2$ (n=1.48) is used as the material thereof. Furthermore, the thickness d2 of the second dielectric films 44 is set such that d2=650/(4×2)≈81 nm when $Si_3N_4$ (n=2.0) is used as the material thereof. It is not absolutely necessary that the thicknesses d1 and d2 of the dielectric films making up the second reflective layer 40 be strictly designed so as to be $\lambda$/(n×4).

$TiO_3$ (n=2.2) may also be used as the material of the dielectric films instead of the silicon nitride films. In this case, the thickness d2 of the second dielectric films 44 is set such that d2=650/(4×2.2)≈73 nm.

In FIG. 1, it is preferable to design the device such that the reflectance R2 of light that is incident on the second reflective layer 40 from the light modulating film 34 is equal to the reflectance R1 of light that is incident on the first reflective layer 32 from the light modulating film 34. The reflectance R1 is determined by a metal material used for the first reflective layer 32, and in cases where Pt is selected, R1 is about 50% to about 80% as described above.

Accordingly, the reflectance R2 in this case is also about 50% to about 80%. Because the second reflective layer 40 is defined by a dielectric multilayer film, the reflectance R2 thereof varies according to the wavelength of the incident light. As will be described later, the first reflective layer 32, the light modulating film 34, the transparent electrode 36, and the second reflective layer 40 of the light control device 10 make up a Fabry-Perot resonator, and have a resonant wavelength $\lambda_m$. In the light control device 10 of the first preferred embodiment, the second reflective layer 40 is formed such that the reflectance R2 is substantially constant in at least one wavelength band in the vicinity of this resonant wavelength $\lambda_m$. For example, in cases where the reflectance R1 of the first reflective layer 32 is about 80%, and the resonant wavelength $\lambda_m$ is 650 nm, it is desirable to configure the device such that the reflectance R2 of the second reflective layer 40 is about 80% in a wavelength band in the range of approximately 600 nm to 700 nm.

The reflectance R2 of the second reflective layer 40 can be adjusted by the materials and thicknesses of the first dielectric films 42 and second dielectric films 44. In the first preferred embodiment, three layers each of the first dielectric films 42 and second dielectric films 44 are alternately laminated in the second reflective layer 40 as shown in FIG. 1. The order of lamination of the first dielectric films 42 and second dielectric films 44 in the second reflective layer 40 may be reversed. Furthermore, third dielectric films may also be additionally laminated in order to make fine adjustments to the reflectance R2.

In the first preferred embodiment, the transparent electrode 36 and first reflective layer 32 define an electrode pair. The potential of the first reflective layer 32 is fixed to ground potential, and the potential of the transparent electrode 36 is controlled by a control portion 12.

The control portion 12 has the function of generating and outputting a control voltage Vcnt that causes the light incident on the light control device 10 to be modulated and emitted. The control portion 12 may also be created inside the substrate 30. The control voltage Vcnt is a signal that takes two values, i.e., a high level VH or low level VL. The high level VH is a potential of about 15 V to about 20 V, while the low level VL is equal to ground potential.

The operation of the light control device 10 constructed as described above will be described. The light control device 10 has a construction in which the light modulating film 34 and transparent electrode 36 are sandwiched by the first reflective layer 32 and second reflective layer 40, and define a so-called Fabry-Perot resonator. The light control device 10, which is a Fabry-Perot resonator, has the reflection characteristic of varying the reflectance R2 according to the wavelength of incident light. The reflectance R of the light control device 10 is defined such that R=Iout/Iin, where Iin is the intensity of incident light, and Iout is the intensity of reflected light. The wavelength at which the reflectance R of the light control device 10 is the smallest is called the resonant wavelength and expressed as $\lambda_m$.

Figure 2:
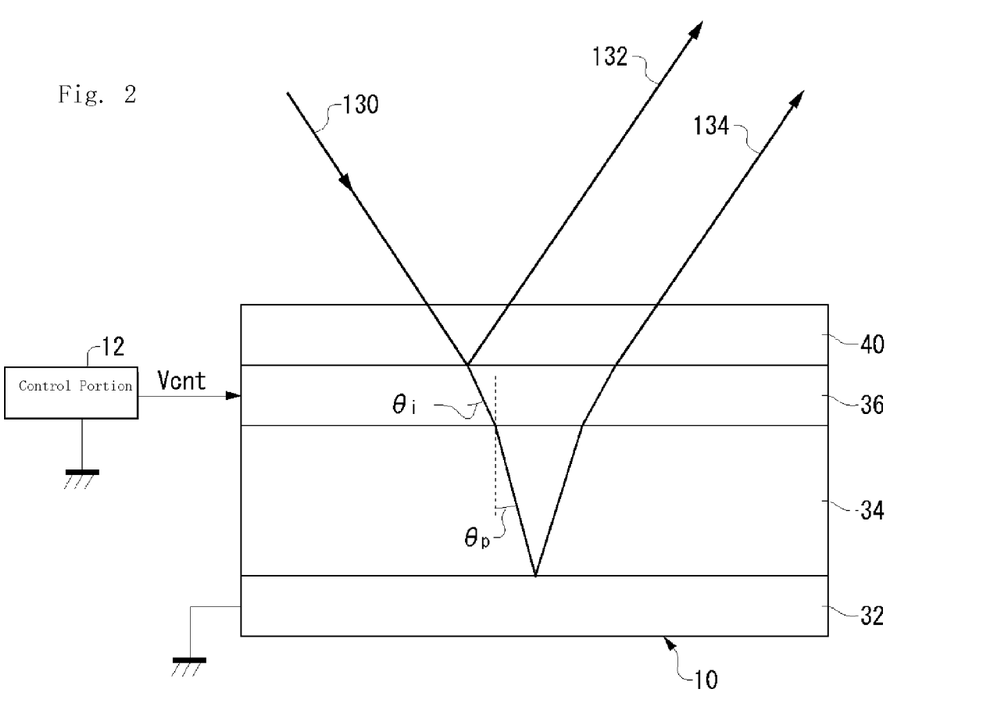
FIG. 2 is a diagram for illustrating the resonant wavelength $\lambda_m$ of the light control device.

FIG. 2 is a diagram for illustrating the resonant wavelength $\lambda_m$ of the light control device 10. In this figure, constituent elements that are the same as in FIG. 1 are labeled with the same symbols. As is shown in FIG. 2, a case is considered in which incident light 130 is incident from above the light control device 10. Here, attention is paid to reflected light 132 that is reflected by the boundary surface between the transparent electrode 36 and second reflective layer 40 and reflected light 134 that is reflected by the boundary surface between the first reflective layer 32 and light modulating film 34.

The phase difference $\delta$ between the reflected light 132 and reflected light 134 is expressed as in Equation (1).

Numerical Formula 2

$$\delta = \frac{4\pi n_i t_i \cos\theta_i}{\lambda} + \frac{4\pi n_p t_p \cos\theta_p}{\lambda} + \phi \tag{1}$$

In Equation (1), $n_i$ is the refractive index of the transparent electrode 36, $t_i$ is the thickness of the transparent electrode 36, $\theta_i$ is the angle of incidence of light that is incident on the light control device 10, $n_p$ is the refractive index of the light modulating film 34, $t_p$ is the thickness of the light modulating film 34, $\theta_p$ is the angle of incidence of light that is incident on the light modulating film 34 from the transparent electrode 36, $\lambda$ is the wavelength of light in air, and $\phi$ is the phase variation amount when light is reflected by the first reflective layer 32. Because the resonant wavelength $\lambda_m$ occurs when the reflected light 132 and reflected light 134 weaken each other, it is necessary to satisfy Equation (2) shown below.

Numerical Formula 3

$$\frac{4\pi n_i t_i \cos\theta_i}{\lambda_m} + \frac{4\pi n_p t_p \cos\theta_p}{\lambda_m} + \phi = 2\pi m + \pi \tag{2}$$

In Equation (2), m is the order number, and is a positive integer. If Equation (2) is modified with respect to $\lambda_m$, Equation (3) is obtained, and the resonant wavelength $\lambda_m$ can be expressed.

Numerical Formula 4

$$\lambda_m = \frac{4\pi n_i t_i \cos\theta_i + 4\pi n_p t_p \cos\theta_p}{2\pi m + \pi - \phi} \tag{3}$$

As was described above, the refractive index n of the light modulating film 34 depends upon the electric field E applied to the light modulating film 34. Here, if the first reflective layer 32 is set at ground potential, and the control voltage Vcnt is applied to the transparent electrode 36, then the electric field E=Vcnt/t is applied to the light modulating film 34 in the thickness direction. In cases where PLZT is used as the material of the light modulating film 34, the following relationship is established between the amount of variation $\Delta n$ in the refractive index n of the light modulating film 34 and the electric field E that is applied:

$$\Delta n = 1/2 \times (n)^3 \times R \times E^2 \tag{4}$$

As is seen from Equation (4), the refractive index of the light modulating film 34 varies in proportion to the square of the applied electric field. Here, R is the electro-optic constant (Kerr constant).

Figure 3:
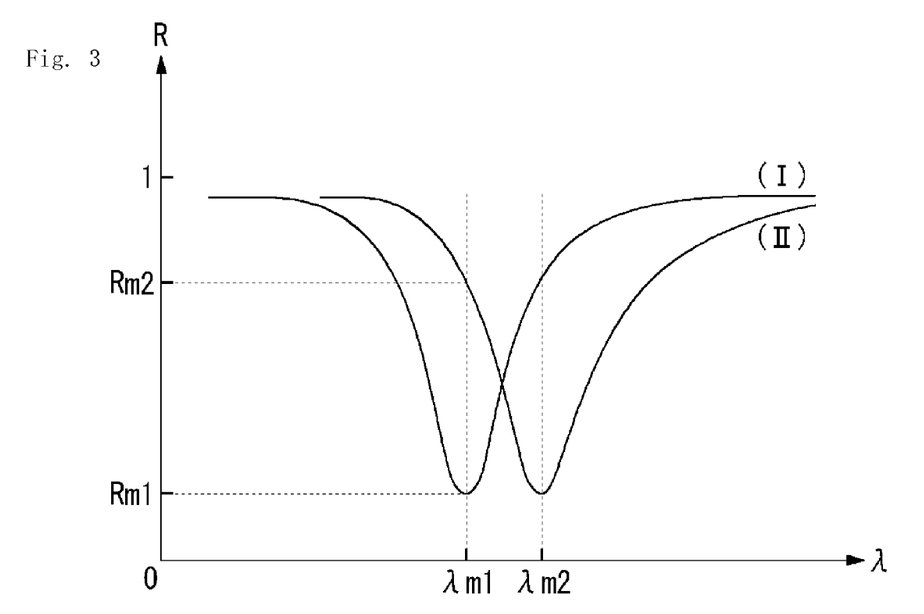
FIG. 3 is a diagram showing the relationship between the wavelength λ of light incident on the light control device and the reflectance R.

FIG. 3 is a diagram showing the relationship between the wavelength $\lambda$ of light incident on the light control device 10 and the reflectance R. Line (I) shown in FIG. 3 indicates the reflection characteristic of the light control device 10 when the control voltage Vcnt is a low level VL, i.e., when the potentials of the transparent electrode 36 and first reflective layer 32 are the same, and no electric field is applied to the light modulating film 34. In this case, the resonant wavelength of the light control device 10 is $\lambda_m 1$. When the control voltage Vcnt is changed to a high level VH, and an electric field E is applied to the light modulating film 34, the refractive index of the light modulating film 34 changes from $n_p$ to $n_p + \Delta n$ based on Equation (4). In cases where the refractive index $n_p$ of the light modulating film 34 changes, the resonant wavelength $\lambda_m$ also changes based on Equation (3), and the resonant wavelength shifts from $\lambda_m 1$ to $\lambda_m 2$. $\lambda_m 2$ is a value that is greater than $\lambda_m 1$. The reflection characteristic in this case is indicated by line (II) in FIG. 3.

In cases where the wavelength $\lambda$ of the light that is incident on the light control device 10 is equal to the resonant wavelength $\lambda_m 1$ at which the control voltage Vcnt is a low level VL, if the control voltage Vcnt is varied from a low level VL to a high level VH, the resonant wavelength $\lambda_m$ shifts from $\lambda_m 1$ to $\lambda_m 2$, so that the reflectance R of the light control device 10 varies from $R_m 1$ to $R_m 2$.

Here, when a case in which no electric field E is applied to the light modulating film 34 is referred to as the off state of the light control device 10, with the reflectance being referred to as $R_{off}$, and a case in which an electric field E is applied is referred to as the on state of the light control device 10, with the reflectance being referred to as $R_{on}$, $R_{on}/R_{off}$ is defined as the on/off ratio. When the intensity Iin of the incident light is constant, the intensity Iout of the reflected light is proportional to the reflectance R. Accordingly, this means that when the on/off ratio is greater, the intensity Iout of the reflected light can be controlled more precisely, so that the light utilization efficiency is also higher.

The reflectance R of the light control device 10 at the resonant wavelength $\lambda_m$ decreases as the reflectance R1 at the first reflective layer 32 and the reflectance R2 at the second reflective layer 40 are closer to each other. Accordingly, as was described above, it is possible to set the reflectance R in the off state at a low value and to obtain a high on/off ratio by adjusting the number of layers and materials of the dielectric multilayer film of the second reflective layer 40 and setting the reflectance R1 at the first reflective layer 32 and the reflectance R2 at the second reflective layer 40 equal to each other.

Thus, in the light control device 10 of the first preferred embodiment, the reflectance is varied by varying the electric field applied to the light modulating film 34, so that an optical switching element that controls the intensity of the reflected light Iout can be achieved.

The light control device 10 of the first preferred embodiment has a reflection-type construction, so that there is no need to cause the incident light Iin to pass through the substrate 30. As a result, light utilization efficiency can be increased compared to conventional transmission-type light control devices. In the light control device 10, furthermore, because the intensity Iout of the reflected light is varied by controlling the reflectance R, no polarizing plate or analyzer is required, so that the advantage of high light utilization efficiency is obtained.

Second Preferred Embodiment

Figure 4:
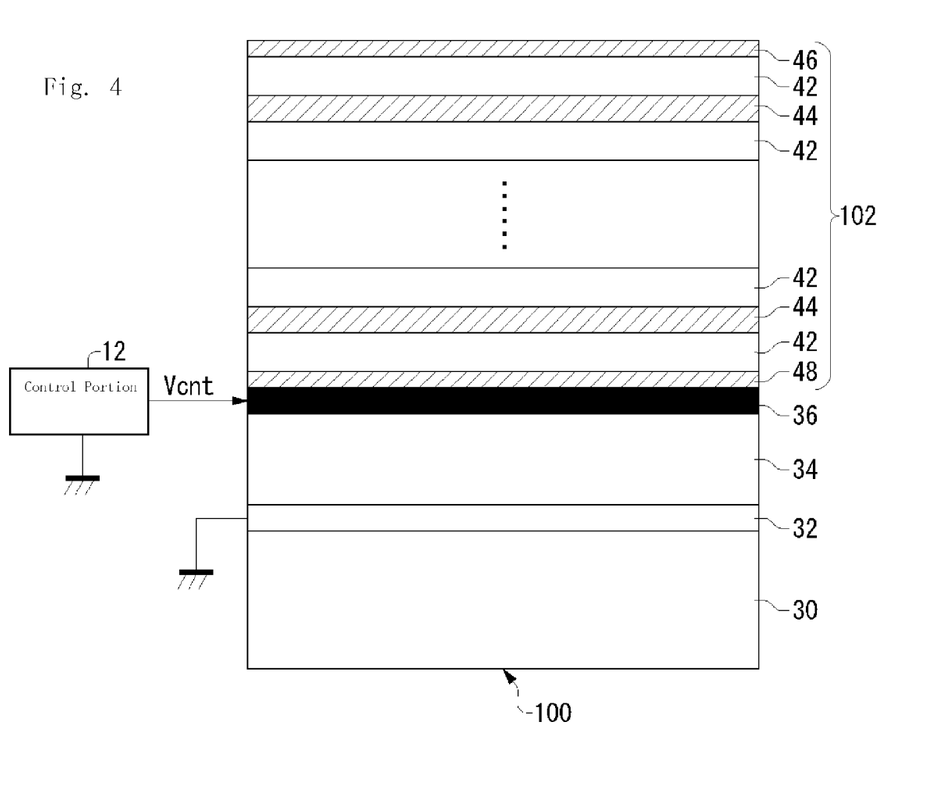
FIG. 4 is a sectional view of a light control device according to a second preferred embodiment of the present invention.

FIG. 4 is a sectional view of a light control device 100 according to a second preferred embodiment of the present invention. As is shown in FIG. 4, the light control device 100 of the second preferred embodiment includes a substrate 30, a first reflective layer 32, a light modulating film 34, a transparent electrode 36, and a second reflective layer 102. Furthermore, constituent elements that are the same as or that correspond to those of the first preferred embodiment are labeled with the same symbols, and a redundant description is appropriately omitted.

In the light control device 100 of the second preferred embodiment, the construction of the second reflective layer 102 formed on the transparent electrode 36 is different from that of the second reflective layer 40 of the light control device 10 of the first preferred embodiment. In the light control device 10 of the first preferred embodiment, as was described above, the second reflective layer 40 is formed such that the reflectance of the second reflective layer 40 is substantially constant in the wavelength band in the vicinity of the resonant wavelength $\lambda_m$ of the light control device 10.

Figure 5:
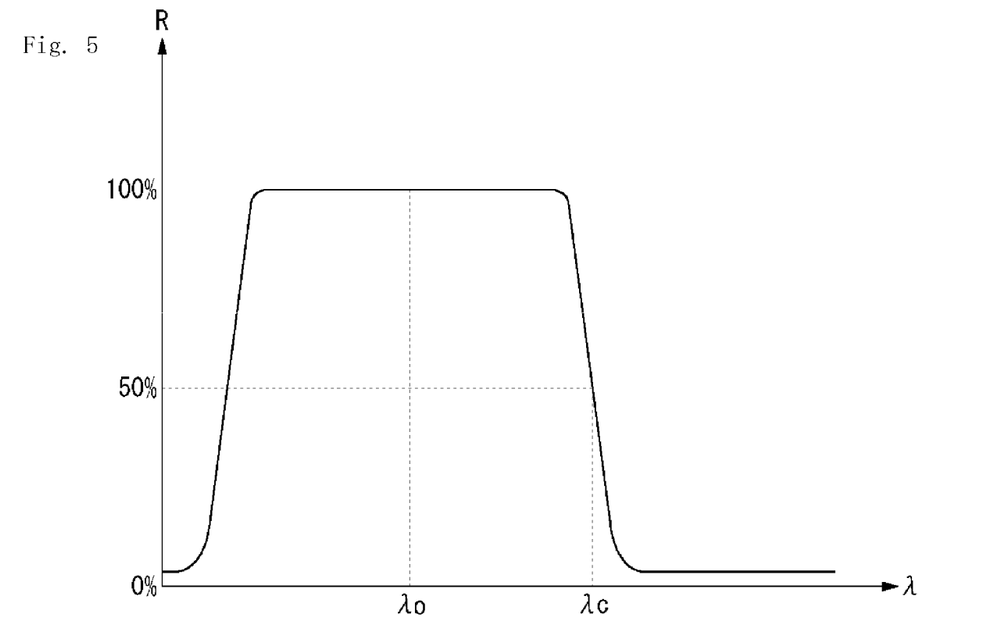
FIG. 5 is a diagram showing the reflection characteristic of the second reflective layer.

In the light control device 100 of the second preferred embodiment, the second reflective layer 102 is formed such that the reflection characteristic is obtained in which the reflection band and transmission band exhibit a steep switching pattern at a specified wavelength. An element possessing such a reflection characteristic which is such that the reflection band and transmission band exhibit a steep switching pattern at a specified wavelength is referred to as an edge filter. FIG. 5 is a diagram showing the reflection characteristic of the second reflective layer 102. In FIG. 5, $\lambda_0$ is the center wavelength of the edge filter. As is shown in FIG. 5, the reflection characteristic of the second reflective layer 102 exhibits a steep switching pattern of the reflection band and transmission band at the wavelength $\lambda_c$. The wavelength $\lambda_c$ is a wavelength at which the reflectance R is about 50%, and is called a cutoff wavelength. Furthermore, the light control device 100 is configured such that the resonant wavelength $\lambda_m$ and cutoff wavelength $\lambda_c$ of the Fabry-Perot resonator defined by the first reflective layer 32, light modulating film 34, transparent electrode 36, and second reflective layer 102 are substantially the same. The fact that the resonant wavelength $\lambda_m$ and cutoff wavelength $\lambda_c$ are substantially the same means that the difference between the two is within approximately 20 nm.

Returning to FIG. 4, the construction of the second reflective layer 102 will be described. As is shown in FIG. 4, the second reflective layer 102 has a construction in which two types of dielectric film having different refractive indices are laminated, and the films are laminated in the following order from the side of the transparent electrode 36: a lower-end dielectric film 48, first dielectric film 42 second dielectric film 44, first dielectric film 42, . . . (repeated laminations of first dielectric films 42 and second dielectric films 44) . . . , first dielectric film 42, second dielectric film 44, first dielectric film 42, and upper-end dielectric film 46. The upper-end dielectric film 46, lower-end dielectric film 48, and second dielectric films 44 are constructed from the same material, wherein the material has a refractive index higher than that of the first dielectric films 42. For example, $Si_3N_4$ ($n_H$=2.0) can be used as the material of the upper-end dielectric film 46, lower-end dielectric film 48, and second dielectric films 44. Moreover, as the material of the first dielectric films 42, $SiO_2$ ($n_L$=1.48) can be used, for example.

These films are formed such that the thickness d1 of the first dielectric films 42 and the thickness d2 of the second dielectric films 44 are 1/(4×n) times the center wavelength $\lambda_0$ of the edge filter shown in FIG. 5. That is, the films are formed in such a manner that the thickness d1 of the first dielectric films 42 is such that $d1=\lambda_0/(n_L\times 4)$, and the thickness d2 of the second dielectric films 44 is such that $d2=\lambda_0/(n_H\times 4)$.

The upper-end dielectric film 46 and lower-end dielectric film 48 are formed in such a manner that the thickness d3 of the upper-end dielectric film 46 and the thickness d4 of the lower-end dielectric film 48 are 1/(8×n) times the center wavelength $\lambda_0$. That is, these films are formed in such a manner that the thickness d3 of the upper-end dielectric film 46 is such that $d3=\lambda_0/(n_H\times 8)$, and the thickness d4 of the lower-end dielectric film 48 is such that $d4=\lambda_0/(n_H\times 8)$.

The variation of the reflection band and transmission band at the cutoff wavelength $\lambda_c$ becomes steeper as the number of laminations of the dielectric films in the second reflective layer 102 increases. However, when the number of laminations increases, there are cases in which a ripple is generated in the vicinity of the cutoff wavelength, so that the thicknesses of the respective dielectric films may also be finely adjusted in order to alleviate this ripple.

As described above, in the second preferred embodiment, the device is configured such that the cutoff wavelength $\lambda_c$ of the second reflective layer 102 and the resonant wavelength $\lambda_m$ of the Fabry-Perot resonator defined by the first reflective layer 32, the light modulating film 34, the transparent electrode 36, and the second reflective layer 102 are substantially the same. The resonant wavelength $\lambda_m$ is determined by the above-mentioned Equation (3). In Equation (3), if this equation is modified such that the resonant wavelength $\lambda_m$ is the cutoff wavelength $\lambda_c$, this can be expressed by Equation (5).

Numerical Formula 5

$$t_p = \frac{\lambda_c\{2\pi m + (\pi - \phi)\}}{4\pi n_p \cos\theta_p} - \frac{n_i \cos\theta_i}{n_p \cos\theta_p} t_i \tag{5}$$

Here, m in Equation (5) is the order number, and is a positive integer. Therefore, the thickness t of the light modulating film 34 which is such that the resonant wavelength $\lambda_m$ and cutoff wavelength $\lambda_c$ are substantially the same is a discrete value determined by the order number m. For example, it is assumed that the refractive index $n_p$ of the light modulating film 34 is 2.3, the angle of incidence $\theta_i$ of the laser light is 0°, and the cutoff wavelength $\lambda_c$ is 650 nm. In this case, in order to make the cutoff wavelength $\lambda_c$ and resonant wavelength $\lambda_m$ substantially the same, it is necessary to set the thickness $t_p$ of the light modulating film 34 at 141 nm (m=1), 283 nm (m=2), 423 nm (m=3), and so on. Furthermore, in the above-mentioned calculation example, the phase variation amount φ in the first reflective layer 32 is 1.0, and $t_i$ is 55 nm.

Figure 6:
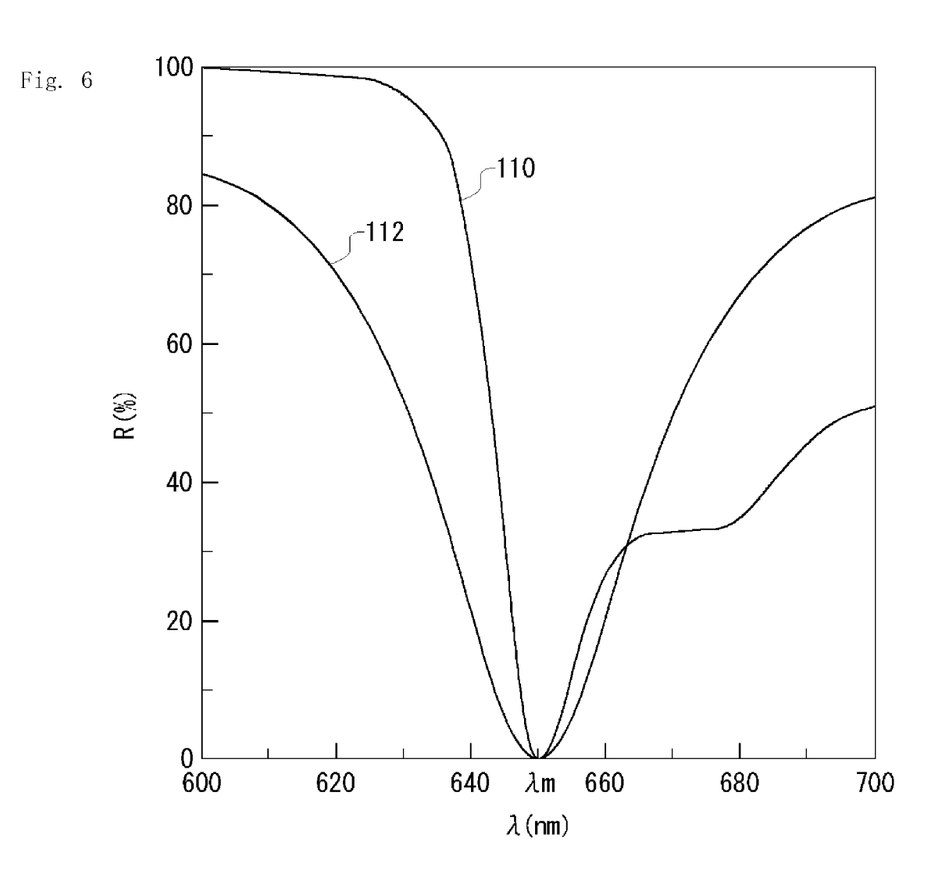
FIG. 6 is a diagram showing the reflection characteristic of the light control device according to the second preferred embodiment of the present invention.

FIG. 6 is a diagram showing the reflection characteristic of the light control device 100 according to the second preferred embodiment of the present invention. In FIG. 6, besides the reflection characteristic 110 of the light control device 100 of the second preferred embodiment, the reflection characteristic 112 of the light control device 10 of the first preferred embodiment is also shown for the sake of comparison. The reflection characteristic 110 in FIG. 6 is a reflection characteristic obtained when the thickness $t_p$ of the light modulating film 34 is 283 nm (m=2), the angle of incidence $\theta_i$ of the laser light is 0°, and the number of laminations in the second reflective layer 102 is 21 layers. The reflection characteristic 112 of the light control device 10 according to the first preferred embodiment shown for the purpose of comparison is a reflection characteristic obtained when the thickness $t_p$ of the light modulating film 34 is 283 nm, the angle of incidence $\theta_i$ of the laser light is 0°, and the number of laminations in the second reflective layer 40 is 7 layers.

As is shown in FIG. 6, it is seen that the reflection characteristic 110 is such that the reflectance R exhibits a steep variation on the short-wavelength side of the resonant wavelength $\lambda_m$ compared to the reflection characteristic 112. In the light control device 100 of the second preferred embodiment as well, as in the light control device 10 of the first preferred embodiment, the resonant wavelength $\lambda_m$ can be shifted by applying an electric field to the light modulating film 34. In this case, because the resonant wavelength $\lambda_m$ shifts in a direction which is such that the resonant wavelength increases as described using FIG. 3, in the case of the light control device 100 of the second preferred embodiment, in which the variation in the reflectance is steep on the short-wavelength side of the resonant wavelength $\lambda_m$, the reflectance $R_{on}$ in an on state is higher than in the case of the light control device 10 of the first preferred embodiment. Specifically, the on/off ratio is more improved in the light control device 100 of the second preferred embodiment than in the light control device 10 of the first preferred embodiment, so that light utilization efficiency is improved.

Figure 7:
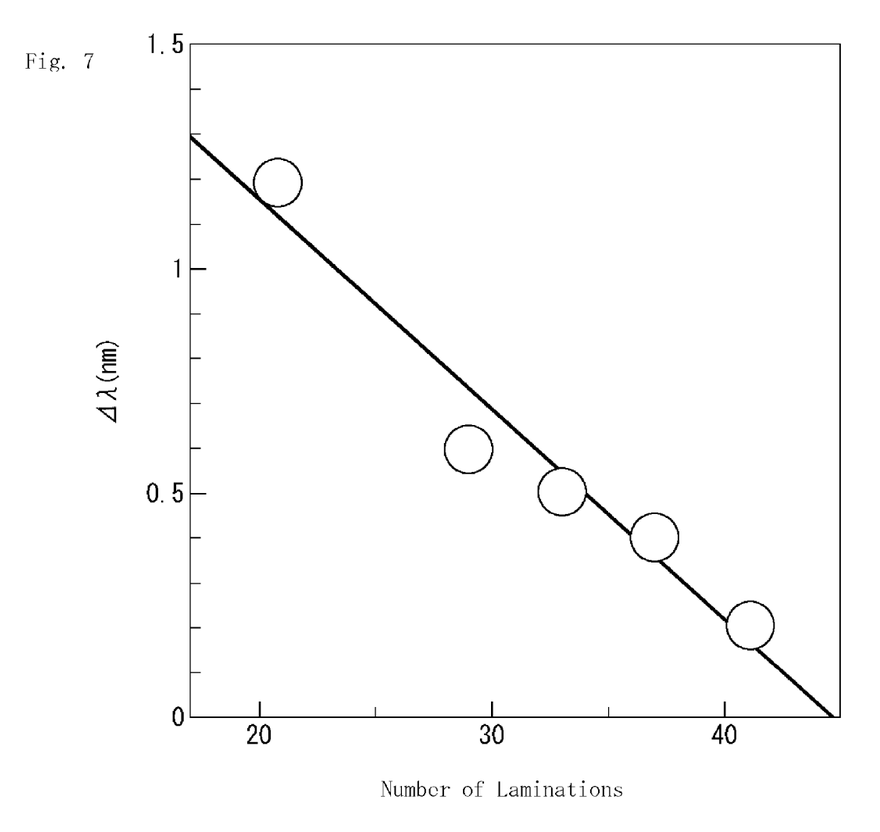
FIG. 7 is a diagram showing the relationship between the number of laminations in the second reflective layer and the amount of shifting Δλ of the resonant wavelength $\lambda_m$.

FIG. 7 is a diagram showing the relationship between the number of laminations in the second reflective layer 102 and the amount of shifting Δλ of the resonant wavelength $\lambda_m$. The vertical axis of FIG. 7 indicates the amount of shifting Δλ of the resonant wavelength $\lambda_m$ when the light control device 100 is in an on state, and the horizontal axis indicates the number of laminations in the second reflective layer 102. Furthermore, the thickness $t_p$ of the light modulating film 34 is 283 nm, and the angle of incidence $\theta_i$ of the laser light is 0°. As is shown in FIG. 7, as the number of laminations in the second reflective layer 102 increases, the amount of shifting Δλ of the resonant wavelength $\lambda_m$ tends to decrease. When the amount of shifting of the resonant wavelength $\lambda_m$ decreases, the reflectance $R_{on}$ in an on state decreases, so that the on/off ratio drops. However, if the number of laminations in the second reflective layer 102 is reduced too much, the steepness of the variation in the reflectance on the short-wavelength side of the resonant wavelength $\lambda_m$ is then lost, so that the on/off ratio still drops. Thus, because the amount of shifting Δλ of the resonant wavelength $\lambda_m$ and the steepness of the variation in the reflectance on the short-wavelength side of the resonant wavelength $\lambda_m$ have a trade-off relationship, the optimum number of laminations of the dielectric films in the second reflective layer 102 can be determined. According to an actual experiment conducted by the present inventor, in cases where the number of laminations of the dielectric films in the second reflective layer 102 is in a range of 19 to 23 layers, a balance between the amount of shifting Δλ of the resonant wavelength $\lambda_m$ and the steepness of the variation in the reflectance is maintained, and a high on/off ratio can be preferably achieved. Therefore, the number of laminations may be determined to be in this range.

Figure 8:
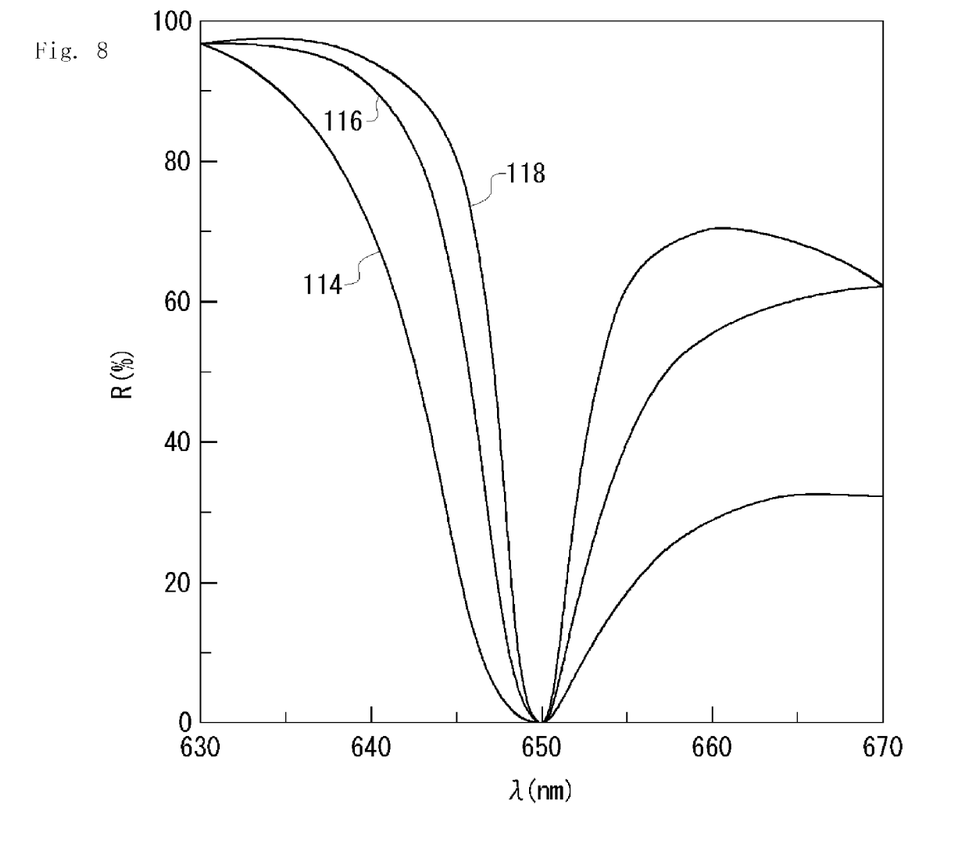
FIG. 8 is a diagram showing the reflection characteristic of the light control device in cases where the thickness of the light modulating film is varied.

FIG. 8 is a diagram showing the reflection characteristics of the light control device 100 in cases where the thickness of the light modulating film 34 is varied. The cutoff wavelength $\lambda_c$ of the second reflective layer 102 is 650 nm, and the thickness $t_p$ of the light modulating film 34 is varied such that the resonant wavelength $\lambda_m$ is 650 nm. The number of laminations of the dielectric films in the second reflective layer 102 is 21 layers, and the angle of incidence $\theta_i$ of the laser light is 0°. In FIG. 8, the reflection characteristic 114 is a reflection characteristic obtained when the thickness $t_p$ of the light modulating film 34 is 283 nm (m=2), the reflection characteristic 116 is a reflection characteristic obtained when the thickness $t_p$ is 1415 nm (m=10), and the reflection characteristic 118 is a reflection characteristic obtained when the thickness $t_p$ is 2830 nm (m=20).

As is seen from FIG. 8, the variation in the reflectance on the short-wavelength side of the resonant wavelength $\lambda_m$ becomes steeper as the thickness $t_p$ of the light modulating film 34 increases. Accordingly, as the thickness $t_p$ of the light modulating film 34 increases, the variation in the reflectance when the resonant wavelength $\lambda_m$ shifts increases, so that the on/off ratio of the light control device 100 is improved.

Figure 9:
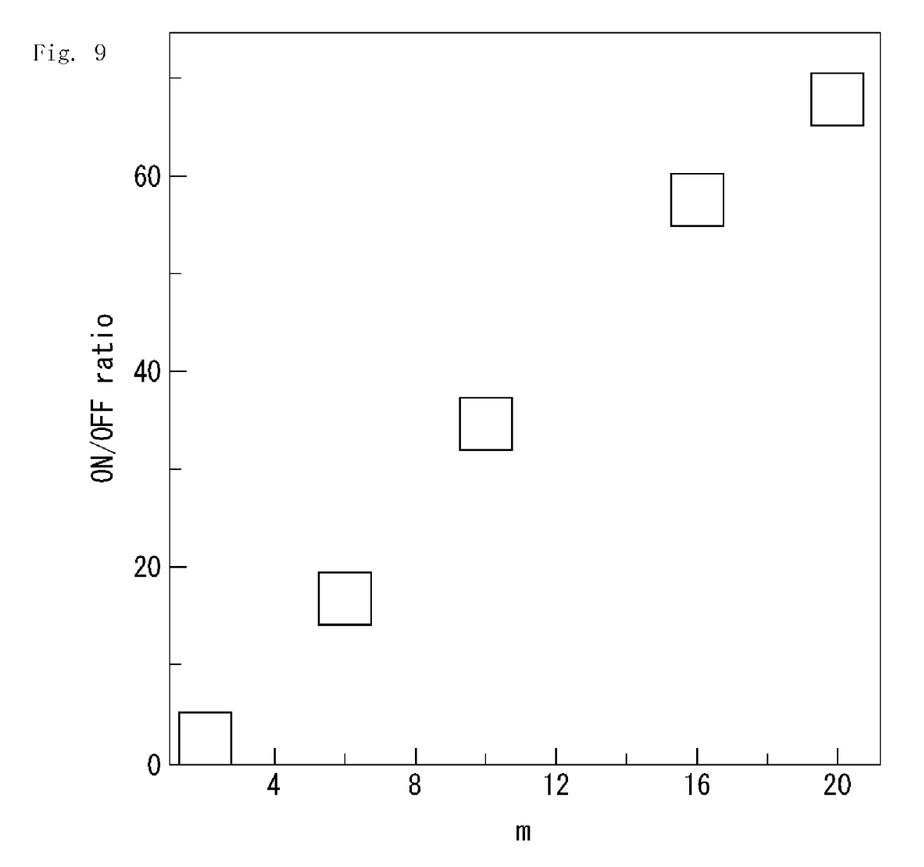
FIG. 9 is a diagram showing the relationship between the on/off ratio of the light control device and the thickness of the light modulating film.

FIG. 9 is a diagram showing the relationship between the on/off ratio of the light control device 100 and the thickness of the light modulating film 34. The vertical axis of FIG. 9 indicates the on/off ratio of the light control device 100. The horizontal axis indicates the thickness $t_p$ of the light modulating film 34 using the order number m. As is indicated in Equation (5), the thickness $t_p$ of the light modulating film 34 is a discrete value determined by the order number m, and as the order number m increases, the thickness $t_p$ of the light modulating film 34 increases. As is shown in FIG. 9, it is seen that the on/off ratio of the light control device 100 increases proportional to the order number m, i.e., proportional to the thickness $t_p$ of the light modulating film 34. However, if the thickness $t_p$ of the light modulating film 34 is too large, a greater electric field must be applied in order to obtain a sufficient variation in the refractive index. Accordingly, it is desirable that the order number m be approximately in the range of $4 \leq m \leq 10$. In cases where the thickness $t_p$ of the light modulating film is set as described above, it is possible to achieve a high on/off ratio upon application of a preferred voltage and to improve light utilization efficiency.

As was described above, in the light control device 100 of the second preferred embodiment, by forming the second reflective layer 102 such that the reflection characteristic thereof exhibits a steep switching pattern of the reflection band and transmission band at a specified wavelength, and setting this specified wavelength so as to be substantially the same as the resonant wavelength, the variation in the reflectance when the resonant wavelength shifts can be increased. As a result, the on/off ratio of the light control device 100 can be improved, so that light utilization efficiency can be improved.

Figure 10A:
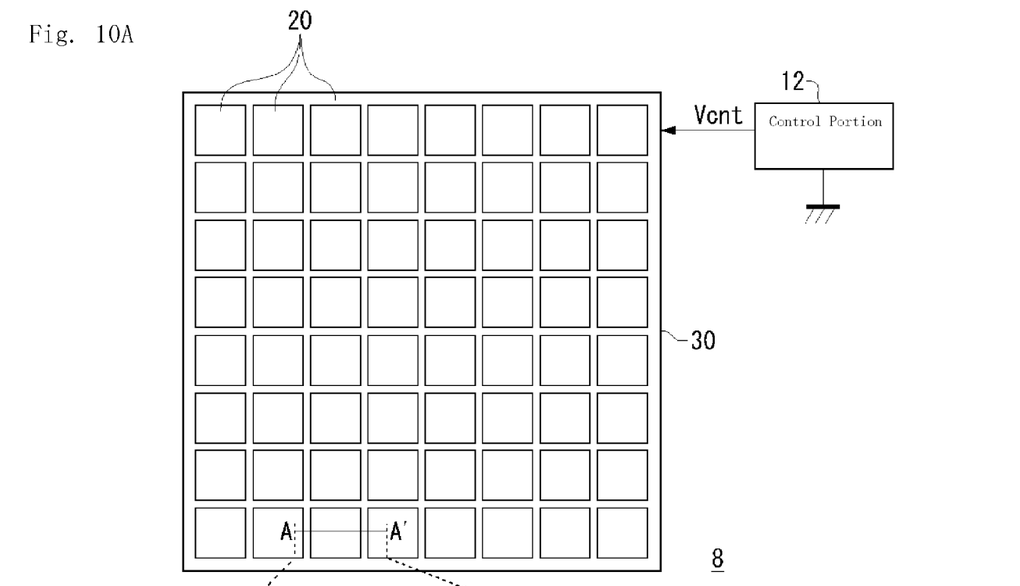
FIG. 10A shows a plan view of a spatial light control device.
Figure 10B:
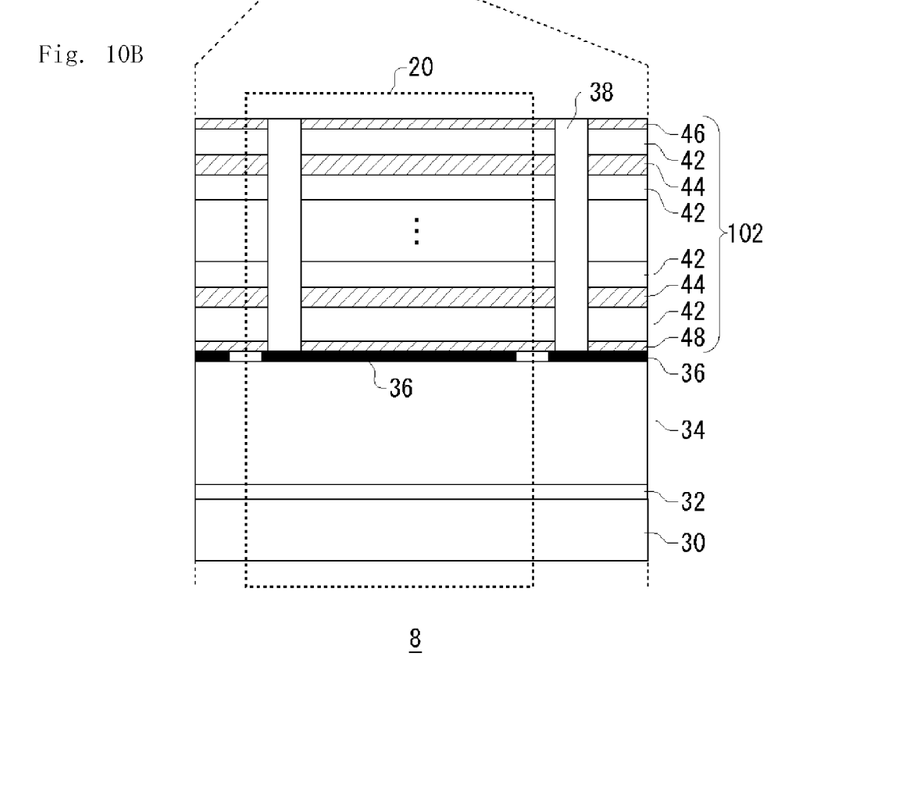
FIG. 10B shows a sectional view along line A-A' in the spatial light control device shown in FIG. 10A.

FIGS. 10A and 10B are diagrams showing a spatial light control device in which light control devices are disposed in the form of a matrix. FIG. 10A shows a plan view of a spatial light control device 8. The spatial light control device 8 includes a plurality of pixels 20 that are arranged on the substrate 30 in a two-dimensional configuration of eight rows and eight columns. Each of the pixels 20 has a size of approximately 20 µm×20 µm.

FIG. 10B shows a sectional view along line A-A' in the spatial light control device shown in FIG. 10A. Each one of the pixels 20 corresponds to the light control device 100 shown in FIG. 4, and the constituent elements such as the light modulating film 34 are preferably the same as in the light control device 100. In the spatial light control device 8, as is shown in FIG. 10B, the transparent electrodes 36 extend to the outside through vias and wiring 38. Al or the like is preferably used as the material of the wiring 38. A protective film may also be additionally formed on the upper surface of the wiring 38.

A control voltage Vcnt is applied from the control portion 12 to the spatial light control device 8 for each pixel 20, so that the reflectance can be controlled for each pixel 20.

Figure 11:
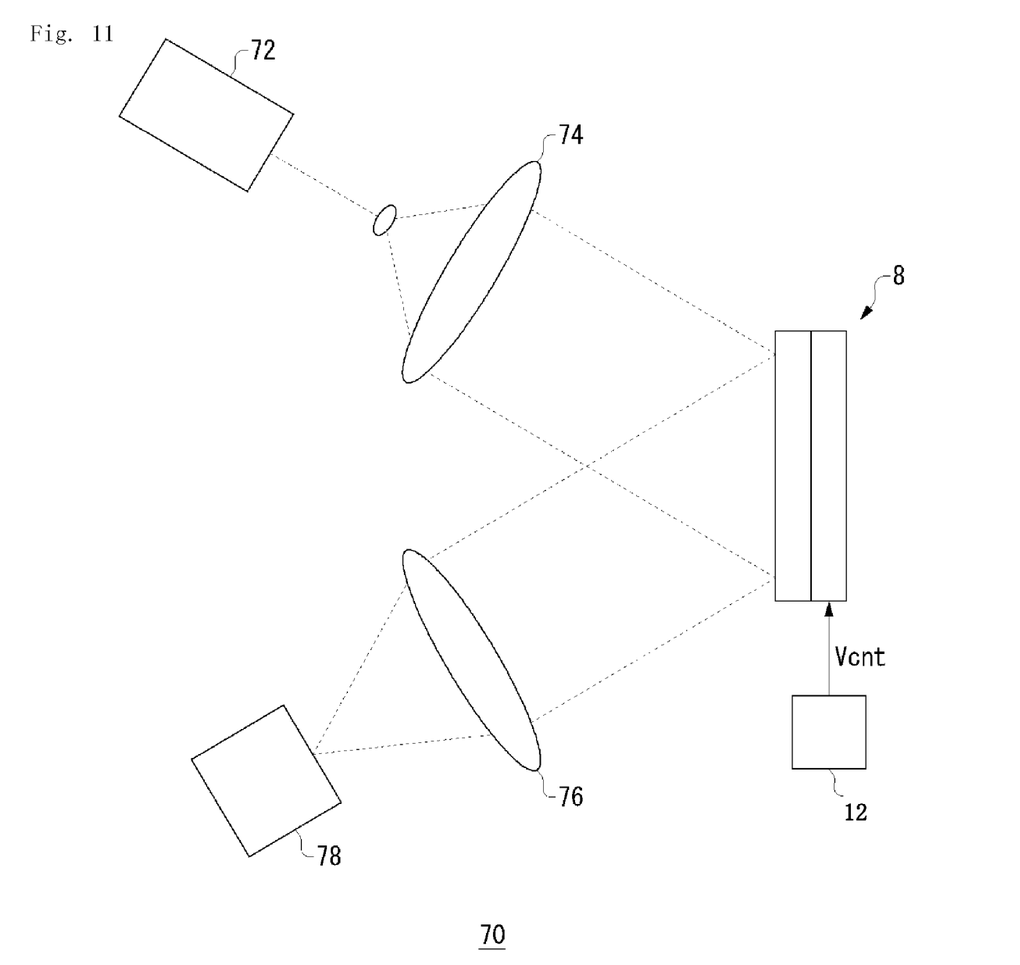
FIG. 11 is a diagram showing a hologram recording device using a spatial light control device.

Various light modulating systems can be constructed using the spatial light control device 8. FIG. 11 is a diagram showing a hologram recording device 70 using the spatial light control device 8. The hologram recording device 70 includes a light-emitting portion, a light-receiving portion, and the spatial light control device 8. The light-emitting portion includes a laser light source 72 and a beam expander 74. The light-receiving portion includes a Fourier transform lens 76 and a recording medium 78.

In the hologram recording device 70, the laser light emitted from the laser light source 72 is divided into two parts of light by a beam splitter (not shown). One light beam is used as reference light and conducted into the recording medium. The beam diameter of the other light beam is expanded by the beam expander 74, and this light illuminates the spatial light control device 8 as parallel light.

The light with which the spatial light control device 8 is illuminated is reflected from the spatial light control device 8 as signal light having a different intensity for each pixel. This signal light is subjected to Fourier transform by passing through the Fourier transform lens 76 and focused within the recording medium 78. The optical paths of the reference light and signal light containing a hologram pattern are intersected to form an optical interference pattern. The entire optical interference pattern is recorded on the recording medium 78 as the variation of the refractive index (refractive index grating).

The present invention has been described based on preferred embodiments. These preferred embodiments are examples, and a person skilled in the art should understand that various modifications are possible in the combination of the respective constituent elements or treatment processes, and that such modifications also fall within the scope of the present invention.

A case was described in which the light control device 100 is preferably used as the spatial light control device of the hologram recording device 70 in a preferred embodiment. However, the present invention is not limited to this, and can also be used in a display device, optical communication switch, optical communication modulator, optical computation device, encryption circuit, and the like.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A light control device comprising:
   a substrate;
   a first reflective layer provided on the substrate;
   a light modulating film provided on the first reflective layer and in which the refractive index varies according to an applied electric field;
   a transparent electrode provided on the light modulating film; and
   a second reflective layer provided on the transparent electrode and having a reflection characteristic such that the reflection band and transmission band exhibit a steep switching pattern at a specified wavelength; wherein
   the specified wavelength and the resonant wavelength of a Fabry-Perot resonator defined by the first reflective layer, the light modulating film, the transparent electrode, and the second reflective layer are substantially the same.

2. The light control device according to claim 1, wherein a thickness $t_p$ of the light modulating film is such that $$t_p = \frac{\lambda_c\{2\pi m + (\pi - \phi)\}}{4\pi n_p \cos\theta_p} - \frac{n_i \cos\theta_i}{n_p \cos\theta_p} t_i,$$

where $\lambda_c$ is the specified wavelength, $n_p$ is the refractive index of the light modulating film, $n_i$ is the refractive index of the transparent electrode, $t_i$ is the thickness of the transparent electrode, $\theta_i$ is the angle of incidence of light incident on the light control device, $\theta_p$ is the angle of incidence of light incident on the light modulating film from the transparent electrode, $\phi$ is the phase variation amount of light reflected by the first reflective layer, and m is the order number.

3. The light control device according to claim 2, wherein the order number m is an integer in the range of $4 \leq m \leq 10$.

4. The light control device according to claim 1, wherein the second reflective layer has a laminated structure including a plurality of dielectric films having different refractive indices.

5. The light control device according to claim 4, wherein at least one of the plurality of dielectric films is a silicon oxide film.

6. The light control device according to claim 4, wherein at least one of the plurality of dielectric films is a silicon nitride film.

7. The light control device according to claim 4, wherein the number of laminations of the dielectric films in the second reflective layer is 19 to 23 layers.

8. The light control device according to claim 1, wherein the light modulating film is made from an electro-optic material whose refractive index varies in proportion to the square of the applied electric field.

9. The light control device according to claim 8, wherein the electro-optic material is lead titanate zirconate or lanthanum lead titanate zirconate.

10. The light control device according to claim 1, wherein the light control device is arranged on a semiconductor substrate.

11. A light control system comprising:
the light control device according to claim 1;
a light-emitting portion that illuminates the light control device with light; and
a light-receiving portion that receives the light emitted from the light control device.

* * * * *